United States Patent [19]
Kelly et al.

[11] Patent Number: 5,179,671
[45] Date of Patent: Jan. 12, 1993

[54] APPARATUS FOR GENERATING FIRST AND SECOND SELECTION SIGNALS FOR ALIGNING WORDS OF AN OPERAND AND BYTES WITHIN THESE WORDS RESPECTIVELY

[75] Inventors: Richard P. Kelly, Nashua; Robert V. Ledoux, Litchfield, both of N.H.

[73] Assignee: Bull HN Information Systems Inc., Billerica, Mass.

[21] Appl. No.: 331,991

[22] Filed: Mar. 31, 1989

[51] Int. Cl.⁵ .............................................. G06F 7/10
[52] U.S. Cl. ............................ 395/375; 364/DIG. 1; 364/238; 364/247; 364/258; 364/259; 364/259.9; 364/262.4; 364/262.8
[58] Field of Search ... 364/200 MS File, 900 MS File

[56] References Cited
U.S. PATENT DOCUMENTS

| | | | |
|---|---|---|---|
| 4,426,680 | 1/1984 | Taque et al. | 364/200 |
| 4,598,365 | 7/1986 | Boothroyd et al. | 364/200 |
| 4,736,291 | 4/1988 | Jennings et al. | 364/200 |
| 4,777,594 | 10/1988 | Jones et al. | 364/200 |
| 4,875,160 | 10/1989 | Brown, III | 364/200 |
| 4,945,479 | 7/1990 | Rusterholz et al. | 364/200 |
| 5,006,980 | 4/1991 | Sanders et al. | 364/200 |
| 5,057,837 | 10/1991 | Colwell et al. | 364/900 |

*Primary Examiner*—Thomas C. Lee
*Assistant Examiner*—Mehmet Geckil
*Attorney, Agent, or Firm*—Gary D. Clapp; John S. Solakian

[57] ABSTRACT

A data processing system includes cache memories for storing instructions and operands. An execution unit stores instructions in an instruction FIFO, operands in a data FIFO and offsets in an offset FIFO. Offsets indicate the location of operands relative to a memory word boundary. Instructions read from the instruction FIFO are applied to a control store subsystem which reads out a firmware word. Specified firmware bits condition multiplexers in the data path to align the operands on the fly during the execution of the instruction.

19 Claims, 8 Drawing Sheets

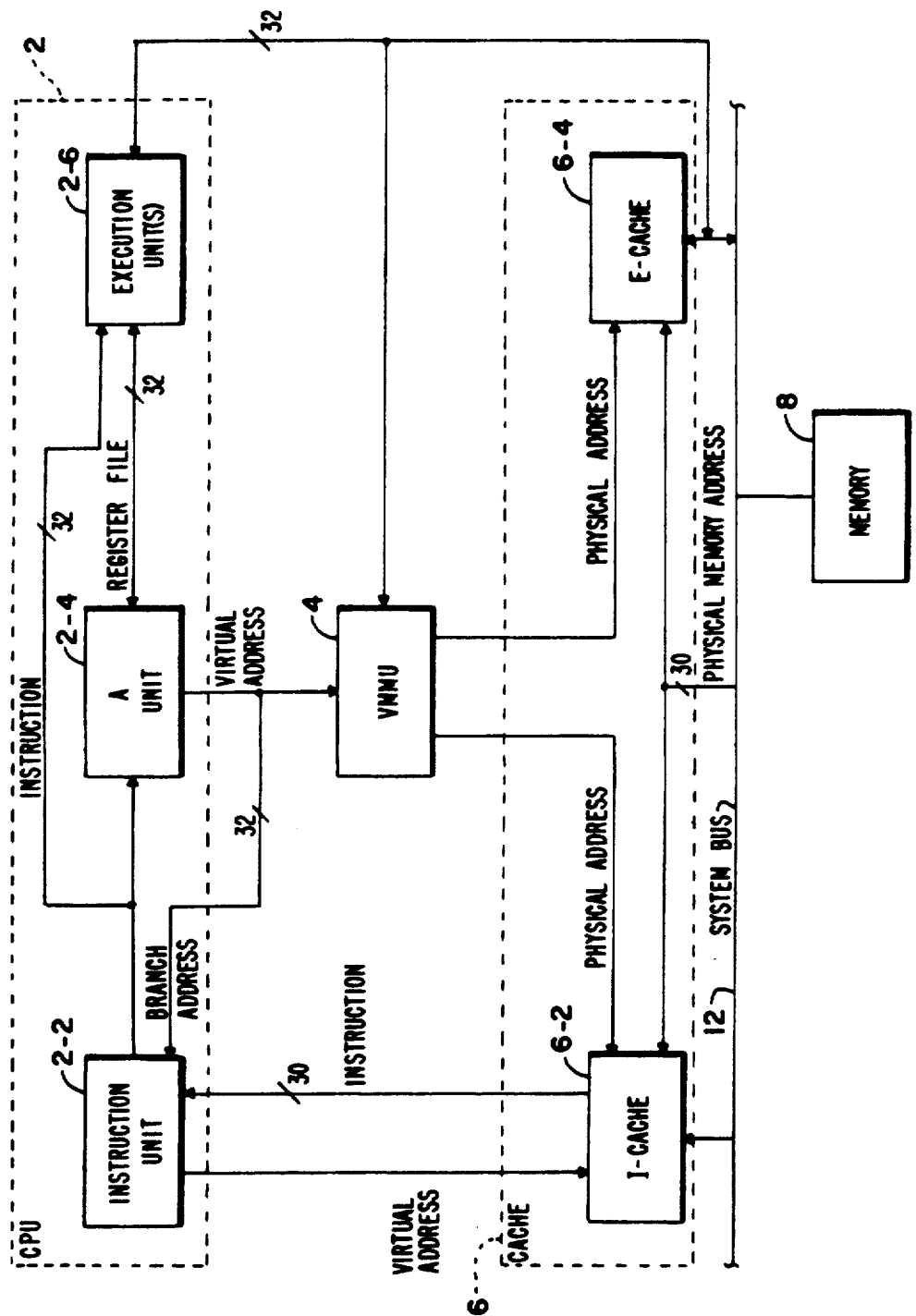

APPARATUS FOR GENERATING FIRST AND SECOND SELECTION SIGNALS FOR ALIGNING WORDS OF AN OPERAND AND BYTES WITHIN THESE WORDS RESPECTIVELY

RELATED APPLICATIONS

The following U.S. Pat. Applications are related applications to the instant application.

1. The patent application of Richard P. Kelly and Jian-Kou Shen entitled, "Control Store Addressing from Multiple Sources," filed on Dec. 19, 1988, Ser. No. 07/286,578, which is assigned to the same assignee as this patent application.

2. The patent application of Richard P. Kelly, Jian-Kou Shen, Robert V. Ledoux, and Chester M. Nibby, Jr., entitled, "Control Store Double Pump Operation," filed on Dec. 19, 1988, Ser. No. 07/286,581, now U.S. Pat. No. 4,916,601 which is assigned to the same assignee as this patent application.

3. The patent application of Richard Kelly, and Robert V. Ledoux entitled, "Control Store Address Generator for Developing Unique Instruction Execution Starting Address," filed on Dec. 19, 1988, Ser. No. 07/286,582 now abandoned, which is assigned to the same assignee as this patent application.

4. The patent application of David E. Cushing, Romeo Kharileh, Jian-Kou Shen and Ming-Tzer Miu entitled, "A Dual Port Read/Write Register File Memory," filed on Dec. 19, 1988, Ser. No. 07/286,552 now U.S. Pat. No. 4,933,909 which is assigned to the same assignee as this patent application.

5. The patent application of David E. Cushing, Richard P. Kelly and Jian-Kou Shen entitled, "A Mechanism for Automatically Updating Multiple Unit Register File Memories," filed on Dec. 19, 1988, Ser. No. 07/286,551 now U.S. Pat. No. 4,980,819, which is assigned to the same assignee as this patent application.

6. The patent application of Thomas F. Joyce and Ming-Tzer Miu entitled, "Production Line Method and Apparatus for High Performance Instruction Execution" filed on Dec. 19, 1988, Ser. No. 07/286,580 now abandoned, which is assigned to the same assignee as this patent application.

BACKGROUND OF THE INVENTION

1. Scope of the Invention

The invention relates generally to the data processing field and more particularly to the apparatus for aligning operands being transferred between a central processing unit and memory.

2. Prior Art

Present day data processing systems include a number of central processor subsystems, each incorporated in a semi-conductor chip. The systems will include one or more memory subsystems. Typically, the subsystems are coupled in common to a system bus. However, a cache memory may be coupled between the system bus and one or more of the central processor subsystems by external logic which performs an alignment operation on operands.

Operands are stored in memory as 8 bit bytes, 16 bit words, or 32 bit double words. Operands are stored in word locations. A double word is stored in memory locations having successive addresses starting with an even numbered address or an odd numbered address. Operands are transferred between the central processing unit and memory over a 32 bit bus. The contents of even numbered address locations are transferred over the 16 high order bit bus positions and the contents of odd numbered address locations are transferred over the 16 low order bit bus positions. This defines a word boundary as starting at an even numbered address location.

An operand alignment problem arises when a word operand starts at an even numbered address location. In that case the word operand must be switched over to the 16 low order bit bus positions. The alignment problem is even more complicated when a double word starts at an odd numbered address location. This requires that the high order word stored in the odd numbered address location be switched to the 16 high order bit bus positions and the low order word in the even numbered address location be switched to the 16 low order bit bus positions.

Previous designs included multiplexers selecting operands read from a cache memory and stored in a register. The operand stored in the register was then used in the execution of the instruction. However this presented a number of timing problems which reduced the system throughput.

Typical solutions to the operand alignment problem area described in U.S. Pat. No. 4,276,596 entitled "Short Operand Alignment and Merge Operation" and U.S. Pat. No. 4,240,144 entitled "Long Operand Alignment and Merge Operation".

OBJECTS OF THE INVENTION

Accordingly, it is a primary object of the present invention to provide a data processor system having an improved throughput.

It is another object of the present invention to provide a system having an improved cost.

SUMMARY OF THE INVENTION

The above and other objects are achieved by the present invention in a preferred embodiment of an execution unit which includes improved apparatus for aligning operands "on the fly".

A data cache is organized in 32 bit double word locations. The high order word of each location has an even address and the corresponding low order word has a sequential odd address. A double word operand may therefore be stored in two 32 bit locations, the high order word being stored in a location having an odd address and the low order word being stored in a location having an even address. A word or a byte operands may be stored in a location having an even address. Words from even addresses are read from cache onto the high order 16 bits of the bus and words from odd addresses are read from cache onto the low order 16 bits of the bus.

Operands are read from cache and stored in a register of a data first-in first-out (FIFO) logic element, instructions are stored in an instruction FIFO and offsets are stored in an offset FIFO of a unit which will process the operand during a single cycle.

The instruction is read out of the instruction FIFO. A control store is responsive to certain fields of the instruction to read out a firmware word. Selected bits of the firmware word are decoded to generate signals specifying the type of operand, double word, single word or byte used in the execution of the instruction. The type signals are combined with offset signals from the offset FIFO to generate selection signals. The offset signals specify whether or not a double word crossed a word boundary, a word was in an even or odd address location in cache or the position of the byte in the cache double word location.

Multiplexer input terminals are conditioned by the selection signals to receive and align the operand on the fly during the execution of the instruction.

BRIEF DESCRIPTION OF THE DRAWINGS

FIG. 2 is a more detailed block diagram of the overall system of FIG. 1.

DESCRIPTION OF THE PREFERRED EMBODIMENT

Figure 1:
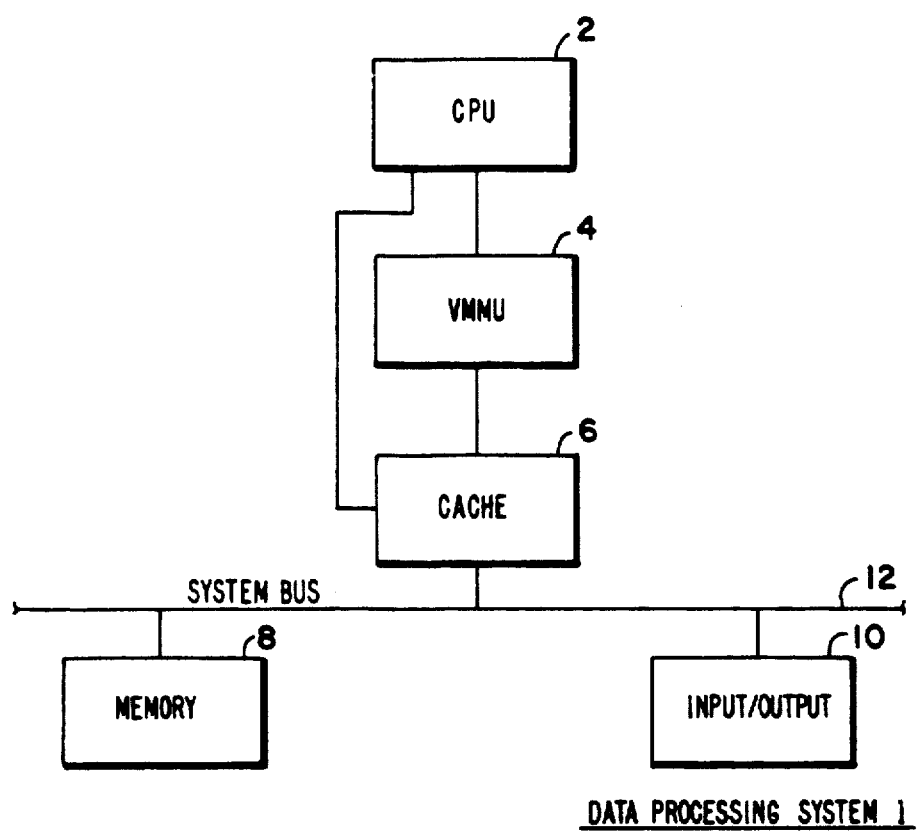
FIG. 1 is a block diagram of the overall system which includes the apparatus of the present invention.

FIG. 1 shows a block diagram of a production pipeline data processing system 1. Included are a central processing unit (CPU) 2, a virtual memory management unit (VMMU) 4, a cache unit 6, a memory subsystem 8, and input/output peripheral unit 10. The cache unit 6, memory unit 8, and input/output peripheral unit 10 are all coupled in common to a system bus 12. The memory 8 stores instructions and operands. Those instructions and operands having the highest probability of being executed immediately, are transferred to cache unit 6 from the memory subsystem 8.

The CPU 2 receives instructions from the cache unit 6 and in the execution of these instructions sends the virtual address portion of the instruction to VMMU 4. The VMMU 4 translates the virtual address into a physical address which are applied to cache unit 6 for fetching the necessary operands to allow the CPU 2 to execute the instructions.

The input/output unit 10 represents typically any number of peripheral controllers with their devices, or an input/output processor which controls peripheral controllers and devices, or the unit 10 may represent a communications subsystem.

FIG. 2 shows in block diagram form the major elements that make up the CPU 2 and the cache unit 6. The CPU 2 includes an instruction (I) unit 2-2, an address (A) unit 2-4, and a number of execution (E) units 2-6. The execution units 2-6 could be a scientific instruction processor or a commercial instruction processor. However, for simplicity of description, only the operation of one of the execution units 2-6 is described which is sufficient to understand the invention. The I unit 2-2, the A unit 2-4, and the E unit 2-6 are each incorporated in their respective semiconductor chips. The cache unit 6 includes an instruction cache (I-cache) 6-2 and an execution Cache (E-cache) 6-4. The I-cache 6-2 stores the instructions that are to be executed and the E-cache 6-4 stores the operands upon which the instructions operate. The I-unit 2-2 performs essentially two functions. It prefetches instructions from I-cache 6-2 and then cracks those instructions to determine how the other units, namely the A unit 2-4 and the E unit 2-6, will further process the instruction. In addition the I-unit 2-2 executes certain branch instructions which are then removed from the production line.

The A unit 2-4 receives the instruction from the I-unit 2-2 and executes the instruction if it is a register-to-register instruction. When the instruction is to be executed by the E unit 2-6, the A unit 2-4 sends a virtual address to the VMMU 4 which translates it into a physical address for the E-cache unit 6-4. E-cache 6-4 sends the operands to the E unit 2-6 for the completion of the execution of the instruction originally received by the instruction unit 2-2 from the I-cache unit 6-2.

The A unit 2-4 will also confirm the execution of a branch instruction and send the branch address back to the instruction unit 2-2 which has already requested the next instruction at the location in I-cache 6-2 specified by the I unit 2-2 pre-fetch branch address. Both the A unit 2-4 and the E unit 2-6 include register files which store the contents of the registers which are accessible to the programmers, that is, so called software visible registers.

Both the I-cache 6-2 and the E-cache 6-4 are coupled to system bus 12 and their contents are updated with instructions and operands received from memory 8.

Instructions are executed in a production pipeline fashion by the elements of CPU 2. That is, the I unit 2-2 receives an instruction from I-cache 6-2, cracks it, and then sends the instruction to the A unit 2-4 and to the E unit 2-6 if it will execute the instruction. The A unit 2-4 either executes the instruction or sends the virtual address to the VMMU 4 for translation in order to address the E-cache 6-4. E-cache 6-4 sends the designated operands to the E unit 2-6.

While the A unit 2-4 is executing its portion of the first instruction from the I unit 2-2, the I unit 2-2 is fetching the second instruction and subsequent instructions from I-cache 6-2. When the A unit 2-4 sends the virtual address specified by the first instruction to the VMMU 4 and notifies the I unit 2-2 of that event, the I unit 2-2 sends, the second instruction to the A unit 2-4. The VMMU 4 addresses the E-cache 6-4 while the A unit 2-4 is processing the second instruction in the pipeline. When the E unit 2-6 is executing the first instruction, the VMMU 4 may be addressing E-cache to fetch the operands of the second instruction while the A unit 2-4 is generating a virtual address of the third instruction. Meanwhile, the I unit 2-2 is cracking the fourth instruction and fetching one of the subsequent instructions. Therefore, in this typical example, there could be five instructions progressing down the production line.

However, since the I unit 2-2 can execute certain branch instructions, and the A unit 2-4 can execute certain software visible register instructions, they are removed from the production line as soon as the execution of those instructions is completed. Similarly, when the A unit 2-4 is processing a branch instruction and the conditions of the branch are met, the A unit 2-4 immediately confirms the branch address of the I unit 2-2 and that branch instruction will be removed from the production line.

Figure 3A:
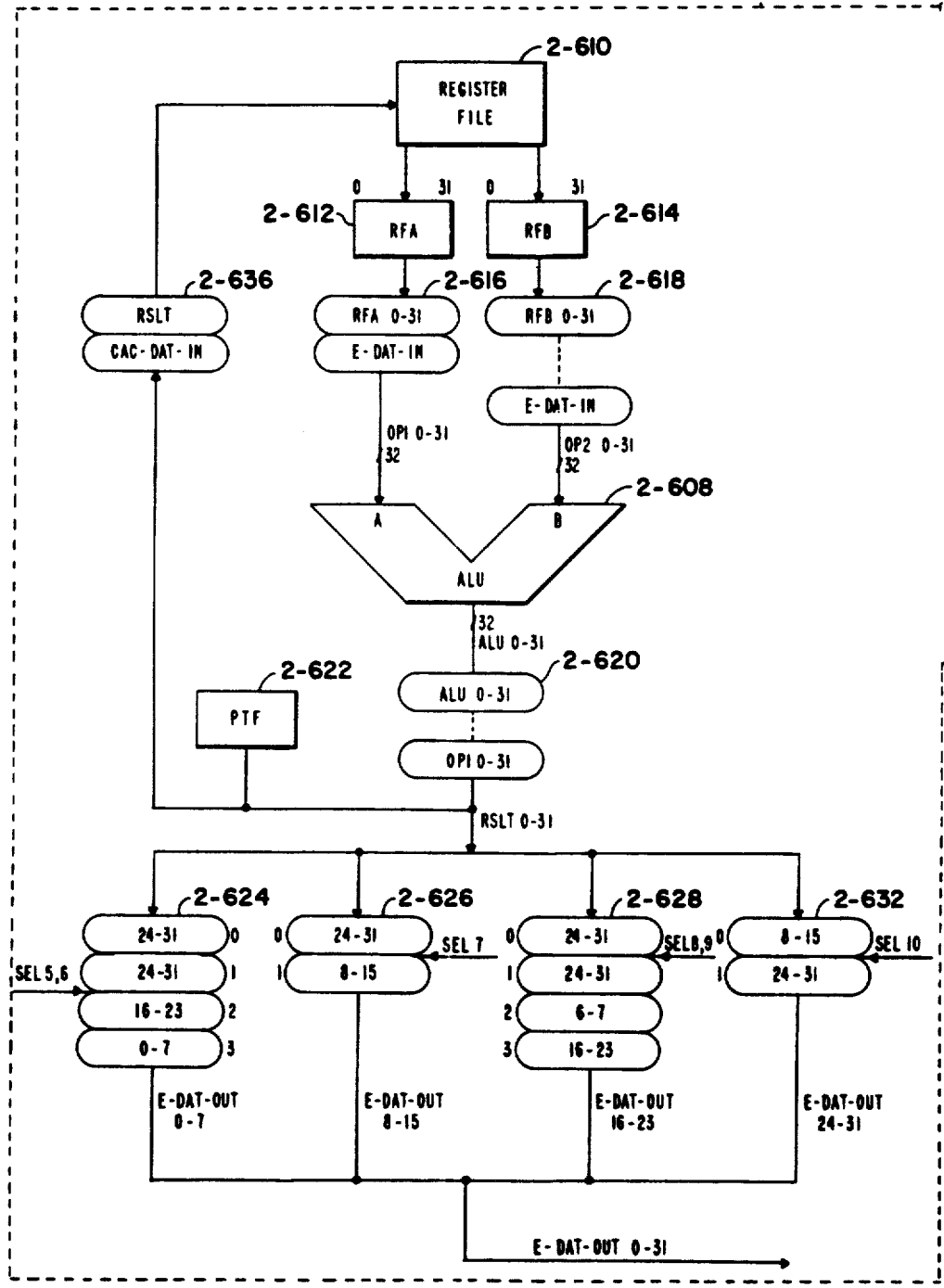
FIGS. 3A, 3B and 3C are logic block diagrams of major elements of the execution unit.
Figure 3B:
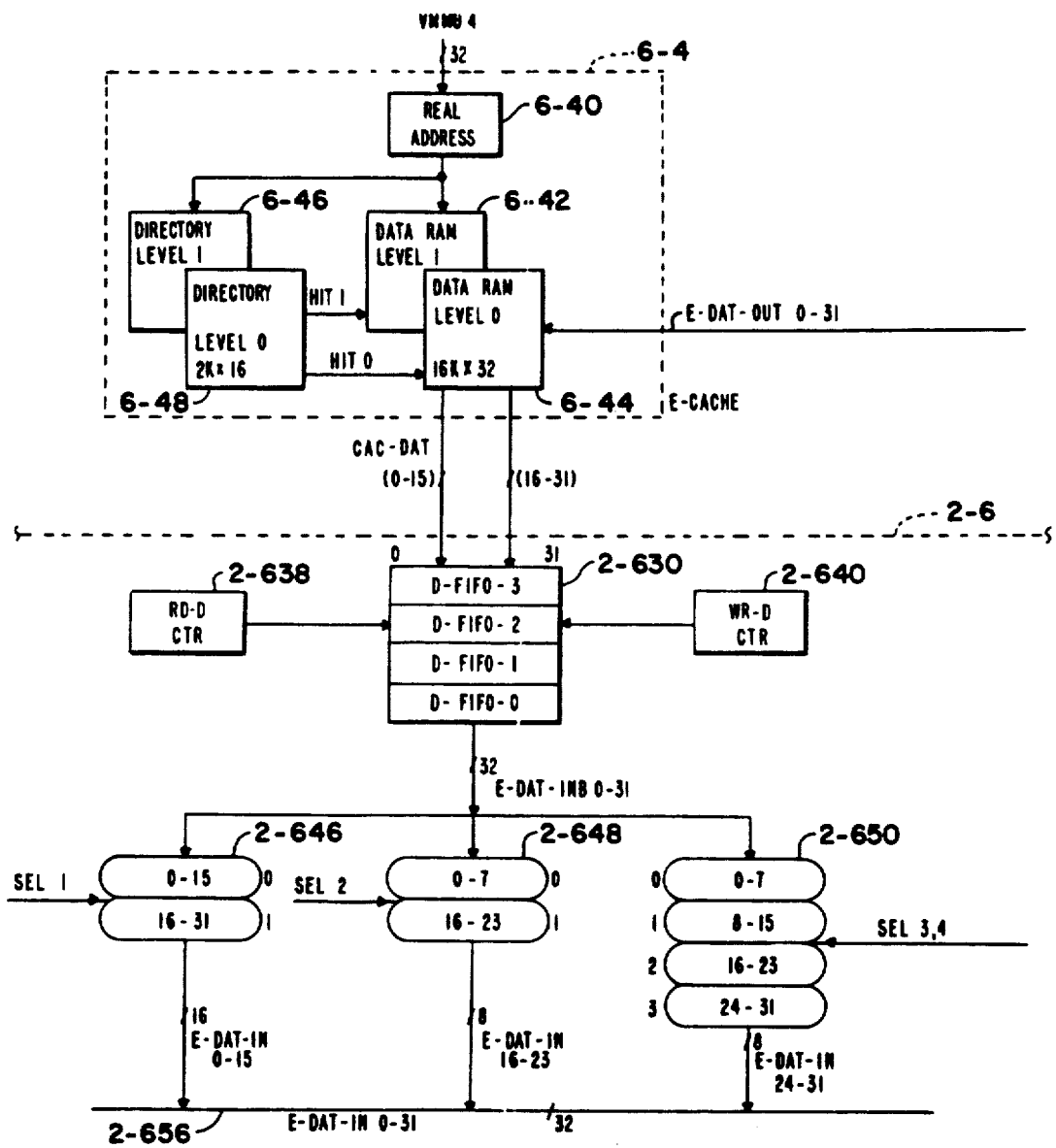
Figure 3C:
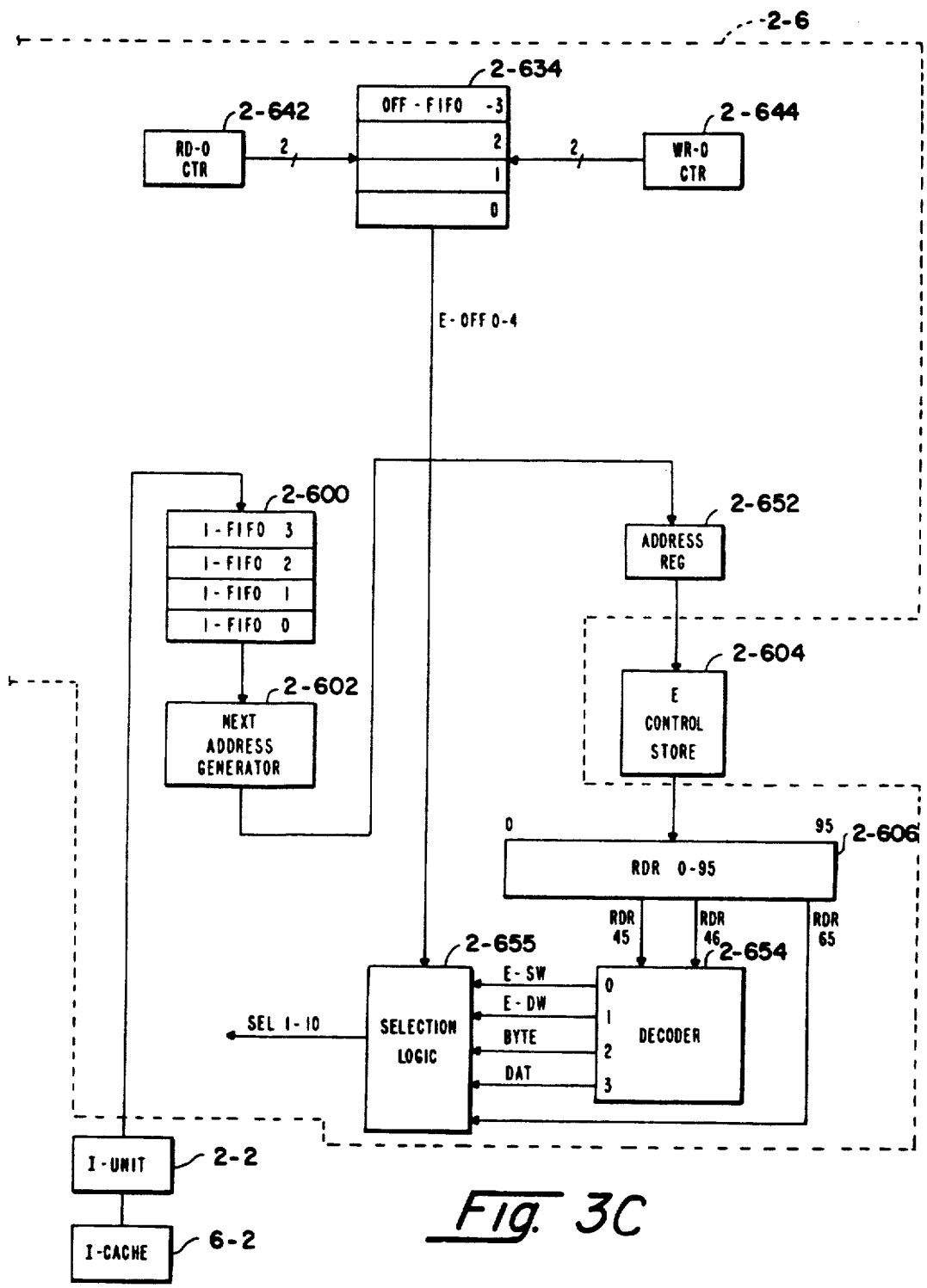

FIG. 3 shows a detailed block diagram of the logic portion of the E unit 2-6 which is used to describe the invention.

The instruction which was stored in the I-cache 6-2 is received from the I unit 2-2 and stored in the next available register of the instruction first-in first-out (FIFO) registers 2-600. FIFO 2-600 includes typically registers I-FIFO 0 through I-FIFO 3. A portion of the instruction is applied to a next address generator (NAG) 2-602 which generates an address of a location in execution (E) control store 2-604 in which is stored a firmware word which enables the logic to execute the instruction. The address generated by the NAG 2-602 is stored in an address register 2-652. The address generation operation is described in related application Ser. No. 07/286,582, entitled "Control Store Address Generator for Developing Unique Instruction Execution Starting Address".

The firmware word in the addressed location of E control store 2-604 is stored in an read data register (RDR register) 2-606. Signals RDR 45 and RDR 46 are applied to a decoder 2-654 to generate signals indicating the operand size. Single word signal E-SW is generated by signals RDR 45 and 46 at logical ZERO. Double word signal E-DW is generated by signals RDR 45 at logical ONE and RDR 46 at logical ZERO. Signal BYTE specifying a byte operand is generated by signals RDR 45 at logical ZERO and RDR 46 at logical ONE. Signal DAT specifying a direct transfer is generated by signals RDR 45 and 46 at logical ONE.

Operands read from an E-cache 6-4 location specified by the VMMU 4 are stored in the next available register of D-FIFO 2-630 via signals CAC-DAT 00-31 under control of write counter (WR-D CTR) 2-640. Operands are read from data first-in first-out register (D-FIFO) 2-630 under control of read counter (RD-D CTR) 2-638 and applied to multiplexers (MUX) 2-646, 2-648 and 2-650 via signals E-DAT-INB 0-31. MUX 2-646 selects signals E-DAT-INB 0-15 or E-DAT-INB 16-31 which appear on bus 2-656 as signals E-DAT-IN 0-15. MUX 2-648 selects signals E-DAT-INB 0-7 or E-DAT-INB 16-23 which appear on bus 2-656 as signals E-DAT-IN 16-23. MUX 2-650 selects signals E-DAT-INB 0-7, E-DAT-INB 8-15, E-DAT-INB 16-23 or E-DAT-INB 24-31 which appear on bus 2-656 as signals E-DAT-IN 24-31.

E-cache 6-4 is a multi-level cache memory, conventional in design. It includes an address register 6-42 which stores a physical address received from the VMMU 4, a two level directory 6-46 and 6-48 and a two level data RAM 6-42 and 6-44. As with a conventional directory, address signals from address register 6-40 are applied to directories 6-46 and 6-48. If an address match is found the appropriate "hit" signal, HIT 1 or HIT 2 activates the respective data RAM 6-42 or 6-44 to read out the addressed location.

An offset first-in first-out register (OFF-FIFO) 2-634 typically includes register's OFF-FIFO 0 through OFF-FIFO 3 which are selected by write counter (WR-CTR 0) 2-644 and read counter (RD-CTR 0) 2-642. Output signal E-OFF-0 at logical ZERO indicates that a single word operand is stored in a word location in E-cache 6-4 having an even word address. Output signal E-OFF-0 at logical ONE indicates that the single word operand is stored in the word location in E-cache 6-4 having an odd word address.

Output signal E-OFF-0 at logical ZERO indicates that a double word operand has the high order word stored in a word location in E-cache 6-4 having an even word address. Output signal E-OFF-0 at logical ONE indicates that the double word operand has the high order word stored in the word location in E-cache 6-4 having an odd word address.

Output signal E-OFF-1 at logical ZERO indicates that a byte operand is stored in the high order half of a word location of E-cache 6-4. Signal E-OFF-1 at logical ONE indicates that the byte operand is stored in the low order half of the word location. Signals E-OFF-0 and E-OFF-1 identify the location of the byte operand in the E-cache 6-4 and the D-FIFO 2-630. Signals E-OFF-0 through E-OFF-4 identify the location of bit instruction operands which are not a part of this invention. The output signals from decoder 2-654, E-SW, E-DW, BYTE, and DAT, as well as signal RDR 65 and signals E-OFF-0 and E-OFF-1 are applied to selection logic 2-655 to generate signals SEL 1 through SEL 10. The output signals of MUX 2-646, E-DAT-IN 0-15 are selected by signal SEL 1 (boolean equation (E-OFF-0 & $\overline{DAT}$)). The $\overline{DAT}$ term is read as "not DAT".

The output signals of MUX 2-648, E-DAT-IN 16-23 are selected by signal SEL 2 (boolean equation ((E-OFF-0 XOR E-DW) + DAT)). The XOR term is read as "EXCLUSIVE OR" and the + term is read as "OR".

The output signals of MUX 2-650, E-DAT-IN 24-31 are selected by signal SEL 3 (boolean equation ((E-OFF-0 XOR E-DW) + DAT)) for the high order bit and signal SEL 4 (boolean equation (E-DW + E-SW + (BYTE & E-OFF-1) + DAT)) for the low order bit for selecting the MUX input.

Assume a 32 bit double word, hexadecimal 1234 5678 with 1234 stored in odd location 1001 and 5678 stored in even location 1002. Signal E-DW at logical ONE indicates a double word and signal E-OFF-0 at logical ONE indicates an offset operation. The operand is stored in the D-FIFO 2-630, bit positions 0-31, as 5678 1234.

MUX 2-646 selects bit positions 16-31 to transfer 1234 to bus 2-656 as signals E-DAT-IN 0-15 since both signals E-OFF-0 and $\land$ DAT are at logical ONE. MUX 2-648 selects bit positions 0-7 transfer 56 to bus 2-656 as signals E-DAT-IN 16-23 since both terms of the EXCLUSIVE OR are at logical ONE MUX 2-650 selects bit positions 8-15 to transfer 78 to bus 2-656 as signals 24-31 since only the low order bit of the boolean equation is at logical ONE. Note that signal DAT at logical ONE transfers the operand to bus 2-656 as is, in this example as 5678 1234.

Assume that a single word, hexadecimal ABCD is stored in an odd address of E-cache 6-4. Signal E-SW at logical ONE indicates a single word and signal E-OFF-0 at logical ONE indicates an offset operation. The operand is stored in the D-FIFO 2-630 as 0000 ABCD.

MUX 2-646 selects bit positions 16-31 to transfer ABCD to bus 2-656 as signals E-DAT-IN 0-15 since both signals E-OFF-0 and $\land$ DAT are at logical ONE. MUX 2-648 selects bit positions 16-23 to transfer AB to bus 2-656 as signals E-DAT-IN 16-23 since signal E-DW is at logical ZERO. MUX 2-650 selects bit positions 24-31 to transfer CD to bus 2-656 as signals E-DAT-IN 24-31. Hexadecimal ABCD ABCD therefore appears on bus 2-656.

If ABCD is stored in an even address location then ABCD 0000 is stored in D-FIFO 2-630 and ABCD ABCD is transferred to bus 2-656 since signal E-OFF-0 is at logical ZERO.

Assume that a byte, hexadecimal 9E is stored in an odd word address of E-cache 6-4 as 9E00. The operand is stored in the D-FIFO 2-630 as 0000 9E00. Signal BYTE at logical ONE indicates a byte operand. In the case of the byte operand, signals E-OFF-0 and E-OFF-1 identify the position of the byte in the double word, the high order byte position having a value of binary 0 and the the low order byte position having a value of binary 3. In the example the byte position is specified by signal E-OFF-0 at logical ONE and signal E-OFF-1 at logical ZERO.

MUX 2-646 transfers 9E00 to bus 2-656 as signals E-DAT-IN 0-15. MUX 2-648 transfers 9E to bus 2-656 as signals E-DAT-IN 16-23. MUX transfers 9E to bus 2-656 as signals E-DAT-IN 24-31. Hexadecimal 9E00 9E9E therefore appears on bus 2-656. However only signals E-DAT-IN 24-31 are used in executing byte instructions.

The operands are stored in register file 2-610 or in E-cache 6-4. Bus 2-656 is coupled to an E-DATA-IN input of MUX's 2-616 and 2-618. Output signals OPI 0-31 from MUX 2-616 and signals OP2 0-31 from MUX 2-618 are applied to the A and B input terminals of an arithmetic logic unit (ALU) 2-608 respectively. Signals OPI 0-31 are also applied to an input terminal of a MUX 2-620. Output signals RSLT 0-31 from MUX 2-620 are applied to register file 2-610 via a MUX 2-636. Output signals from RDR 0-95 control the logic paths the operands follow during the execution of instructions.

Operands are stored in E-cache 6-4 from register file 2-610, registers RFA 2-612 and RFB 2-614, MUX's 2-216 and 2-218 respectively, ALU 2-608, MUX 2-620, and the E-DAT-OUT MUX's 2-624, 2-626, 2-628 and 2-632.

The output signals of MUX 2-624, E-DAT-OUT 0-7 are selected by signal SEL 5 (boolean equation (RDR 65 +E-SW +E-DW)) for the high order bit and signal SEL 6 (boolean equation (RDR 65 +(E-DW & E-OFF-0))) for the low order for selecting the MUX input.

The output signals of MUX 2-626, E-DAT-OUT 8-15 are selected by signal SEL 7 (boolean equation (RDR 65 +(E-DW & ˆE-OFF-0))).

The output signals of MUX 2-628, E-DAT-OUT 16-23 are selected by signal SEL 8 (boolean equation (RDR 65 +E-SW +E-DW)) for the high order bit and signal SEL 8 (boolean equation (RDR 65 +E-SW +(E-DW &ˆE-OFF-0))) for the low order bit for selecting the MUX output signals of MUX 2-632, E-DAT-OUT 24-31 are selected by signal SEL 10 (boolean equation (RDR 65 +∧(E-DW & E-OFF-0))).

Assume the 32 bit double word, hexadecimal 1234 5678, is to be stored in locations 1001 and 1002 of E-cache 6-4. Therefore signals E-DW and E-OFF-0 are at logical ONE. MUX 2-624 selects RSLT bit positions 16-23 to transfer 56 to E-cache 6-4 via signals E-DAT-OUT 0-7. MUX 2-626 selects RSLT bit positions 24-31 to transfer 78 to E-cache 6-4 via signals E-DAT-OUT 8-15. MUX 2-628 selects RSLT bit positions 0-7 to transfer 12 to E-cache 6-4 via signals E-DAT-OUT 16-23. MUX 2-632 selects RSLT bit positions 8-15 to transfer 34 to E-cache 6-4 via signals E-DAT-OUT 24-31. The operand is sent to E-cache 6-4 as 5678 1234.

Assume the single word, hexadecimal ABCD appearing as signals RSLT 16-31, is to be stored in an odd location in E-cache 6-4. Therefore signals E-SW and E-OFF-0 are at logical ONE. MUX 2-624 selects RSLT bit positions 16-23 to transfer AB to E-cache 6-4 via signals E-DAT-OUT 0-7. MUX 2-626 selects RSLT bit positions 24-31 to transfer CD to E-cache 6-4 via signals E-DAT-OUT 8-15. MUX 2-628 selects RSLT bit positions 16-23 to transfer AB to E-cache 6-4 via signals E-DAT-OUT 16-23. MUX 2-632 selects RSLT bit positions 24-31 to transfer CD to E-cache 6-4 via signals E-DAT-OUT 24-31. The operand is sent to E-cache 6-4 as ABCD ABCD and stored in the odd location as ABCD.

Assume the byte, hexadecimal 9E appearing as 009E on signals RSLT 16-31, is to be stored in an odd location of E-cache 6-4. Since the byte is in byte position binary 11 of the double word, signals E-OFF-0 and E-OFF-1 are at logical ONE. However, for the byte transfer these signals are redundant and position 0 of MUX,s 2-624, 2-626 and 2-628 is selected and signals RSLT 24-31, hexadecimal 9E9E9E are sent to E-cache 6-4 as signals E-DAT-OUT 0-7,8-15 and 16-23. Position 1 of MUX 2-632 transfers hexadecimal 9E as signals RSLT 8-15 to E-cache 6-4 as signals E-DAT-OUT 24-31. Signals E-DAT-OUT will transfer hexadecimal 9E9E-9E9E but only byte 9E is written into the odd location of E-cache 6-4.

Note that if control store 2-604 bit RDR 65 is at logical ONE, then signals RSLT 0-31 are transferred directly to signals E-DAT-OUT 0-31.

Figure 4A:
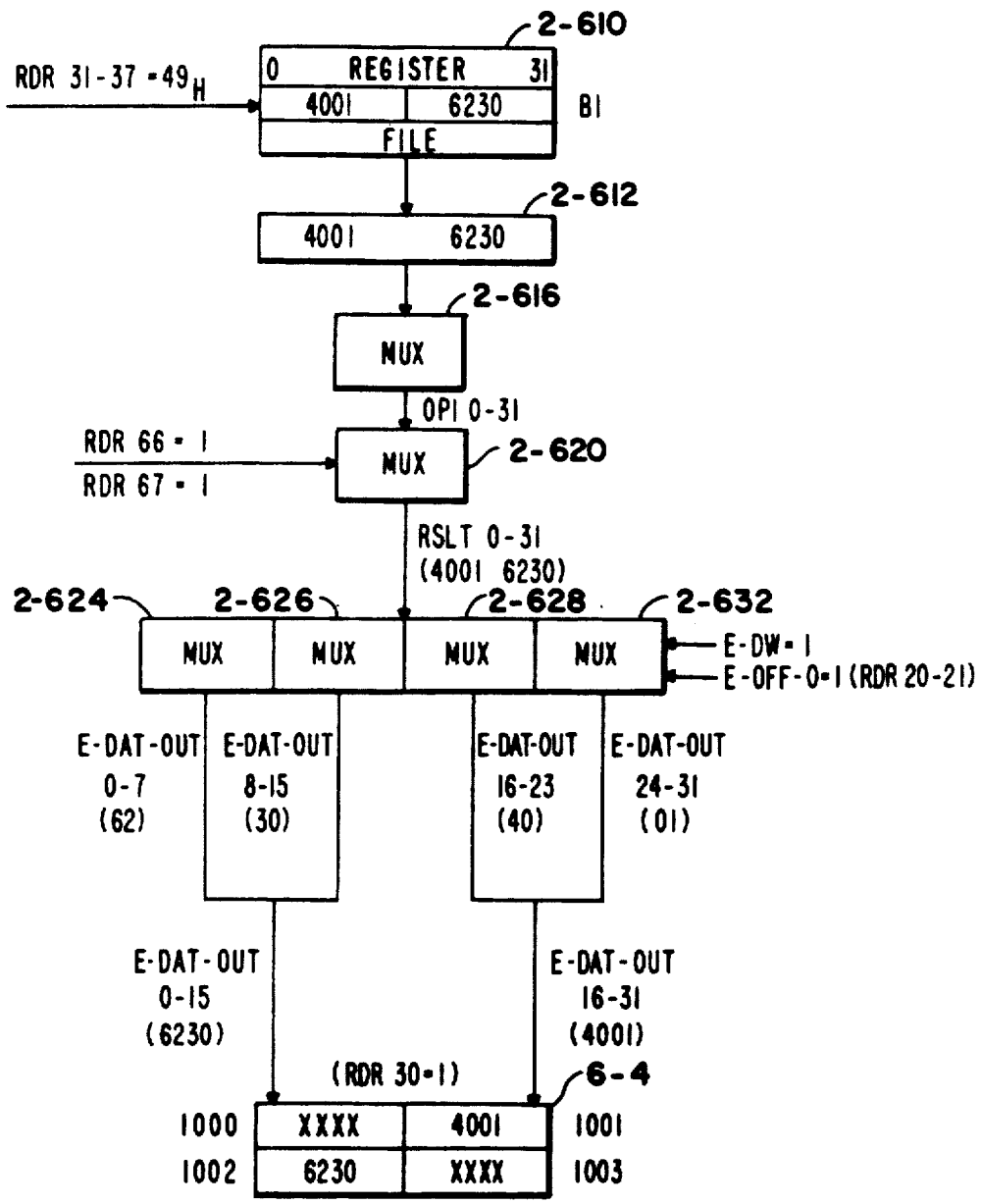
FIGS. 4A and 4B demonstrate the invention by an example.
Figure 4B:
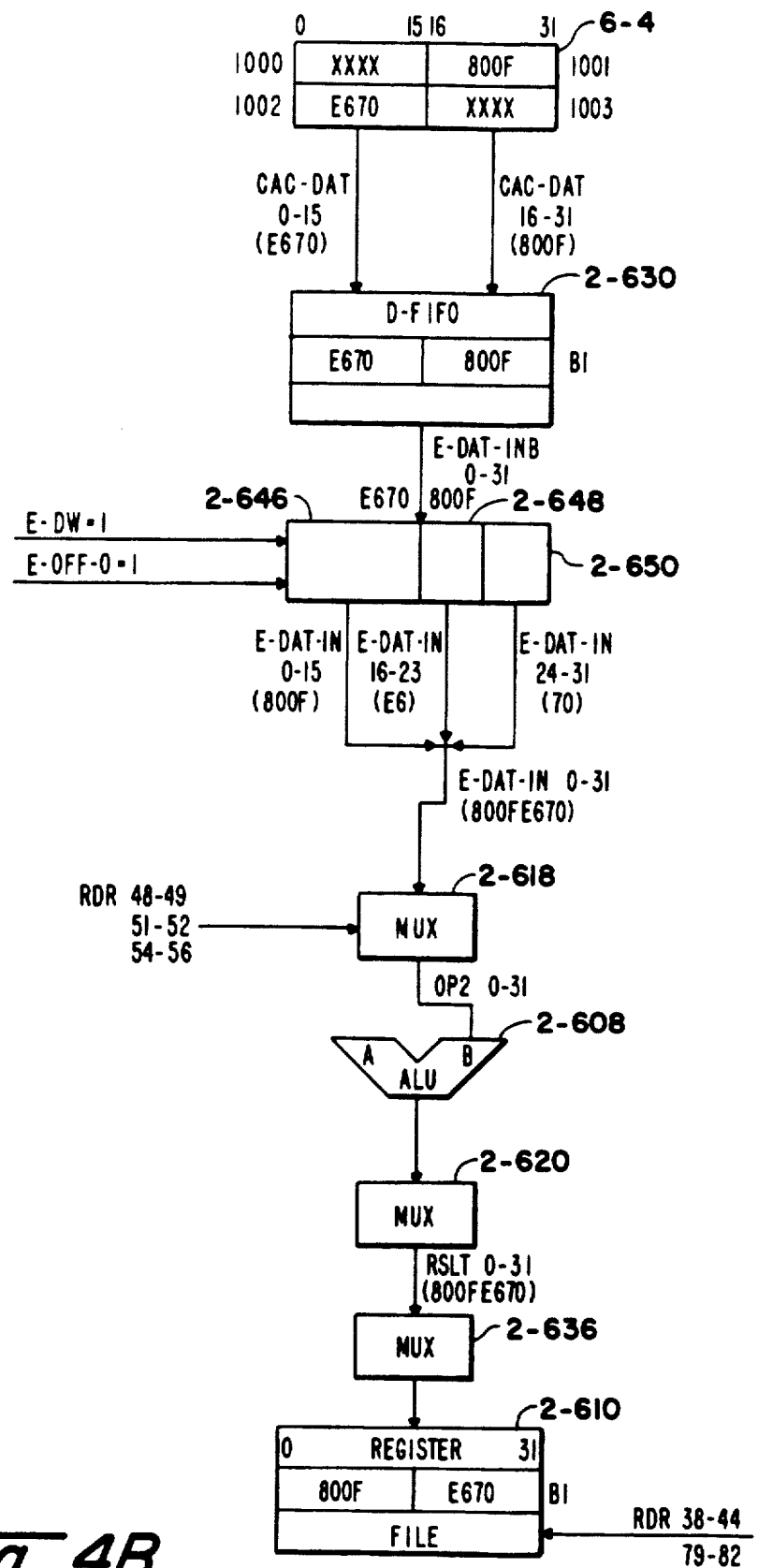

FIGS. 4A and 4B show the flow of the operands through the logic of the E unit 2-6 during the execution of the Swap B1 (SWBI) instruction. The SWBI instruction swaps the contents of register B1 in register file 2-610 with the contents of a location in E-cache 6-4. The location address is specified by the instruction. During the execution of the instruction, the A unit 2-4 sends a virtual address to the VMMU 4. The VMMU 4 translates the virtual address to a physical address which is applied to the address terminals of E-cache 6-4. The contents of the location is then stored in the next available register of the D-FIFO 2-630.

The SWBI instruction is identified by the system as hexadecimal 9E80 1001 (bit positions 0-15 are binary 1001 1110 1000 0000). Bit position 0 (1) indicates a double operand instruction. Bit positions 1-3 (001) specify the B1 register. Bit positions 4-8 (11101) specify the OP code. Bit positions 9-15 (000 0000) indicate that the E-cache 6-6 address of the high order word is specified by bit positions 16-31 or hexadecimal 1001.

In order to describe the invention, assume that hexadecimal 800F is stored in the odd numbered location hexadecimal 1001 and hexadecimal E670 is stored in an even numbered location hexadecimal 1002 of E-cache 6-4. The double operand is stored in the next available register of register file 2-610 as hexadecimal E670 800F. The transposition occurs because word operands read from even numbered addresses appear on signals CAC-DAT 0-15 and word operands read from odd numbered addresses appear on signals CAC-DAT 16-31. Word boundaries are assumed to start with even numbered addresses.

Further assume that hexadecimal 4001 6230 is stored in register B1 of register file 2-610 and that hexadecimal 4001 is to be stored in location hexadecimal 1001 and hexadecimal 6230 is to be stored in location hexadecimal 1002 of E-cache 6-4. Again operand words being stored in even numbered locations of E-cache 6-4 are transferred by signals E-DAT-OUT 0-15 and to odd numbered locations by signals E-DAT-OUT 16-31.

The SWBI instruction is executed by the E unit 2-6 during two firmware cycles. Referring to FIG. 4B, during the first firmware cycle, the A port of register file 2-610 is addressed and the contents of register B1, 4001 6230 is stored in register RFA 2-612. The output signals of RFA 2-612 are applied to Mux's 2-624, 2-626, 2-628, and 2-632 via MUX 2-616, signals OPI 0-31, MUX 2-620, and signals RSLT 0-31.

Since this is a double word operand, signal E-DW is at logical ONE. Also signal E-OFF-0 is at logical ONE since the operand starts at an odd address boundary. therefore hexadecimal 62 is selected by input terminal 2 of MUX 2-624, hexadecimal 30 is selected by input terminal 0 of MUX 2-626, hexadecimal 40 is selected by input terminal 2 of MUX 2-628, and hexadecimal 01 is selected by input terminal 0 of MUX 2-632. Hexadecimal 6230 4001 appear as signals E-DAT-OUT 0-31 which are applied to E-cache 6-4. Hexadecimal 4001 is read into location hexadecimal 1001 and hexadecimal 6230 is read into location 1002 of E-cache 6-4.

Referring to FIG. 4B, during the second firmware cycle, the contents of the specified register in the D-FIFO 2-630, hexadecimal E670 800F is applied to the input terminals of MUX,s 2-646, 2-648, and 2-650 as signals E-DAT-INB 0-31. Signals E-DW and E-OFF-0 are at logical ONE, therefore hexadecimal 800F is selected by input terminal 1 of MUX2-646, hexadecimal E6 is selected by input terminal 0 of MUX 2-648, and hexadecimal 70 is selected by input terminal 1 of MUX 2-650. Hexadecimal 800F E670 is stored in register B1 of register file 2-610 via signals E-DAT-IN 0-31, MUX 2-618, signals OP2 -0-31, ALU 2-608, signals ALU 0-31, MUX 2-620, signals RSLT 0-31, and MUX 2-636.

Figure 5:
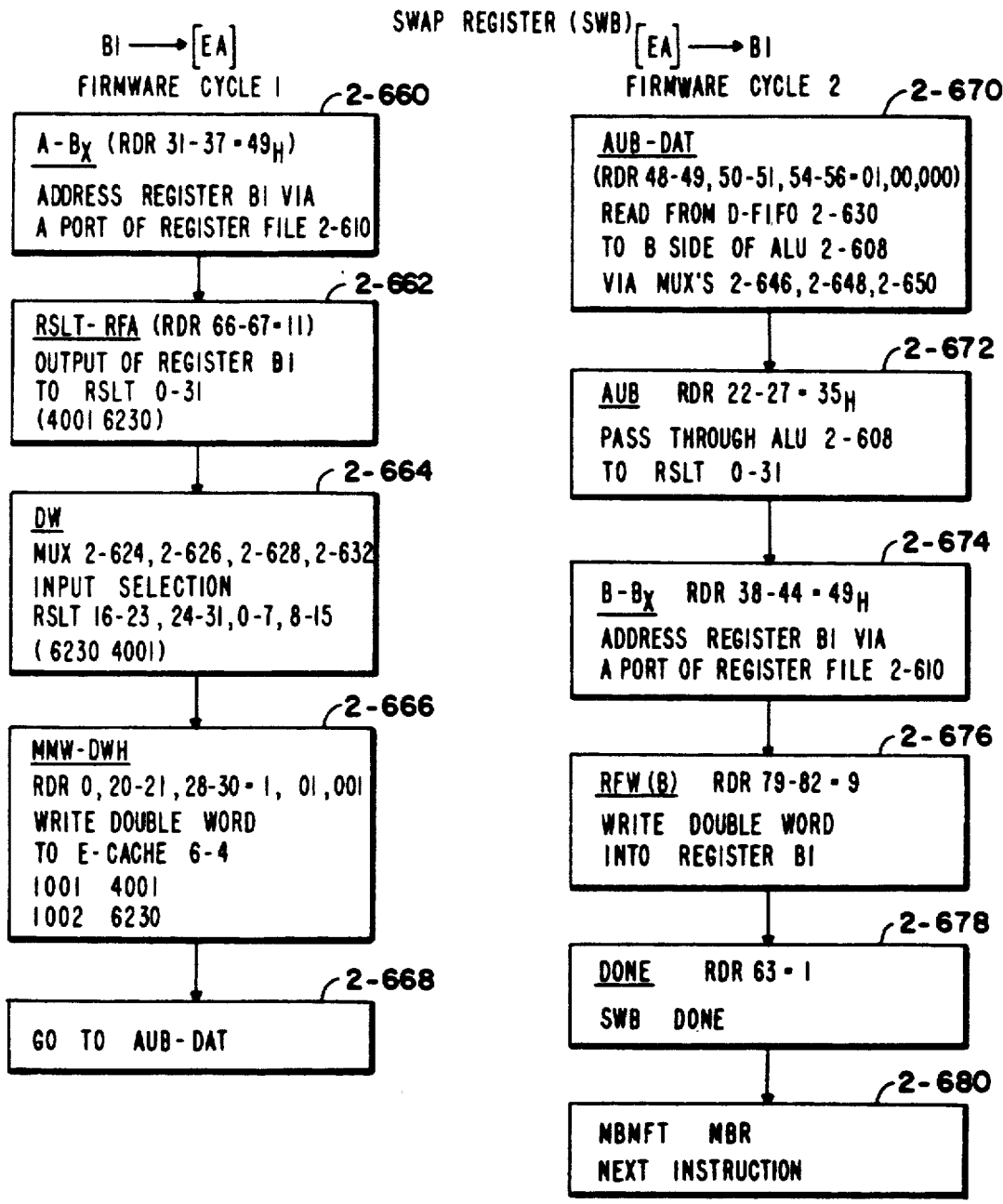
FIG. 5 is a firmware block diagram demonstrating the example of FIGS. 4A and 4B.

FIG. 5 is a flow diagram of the firmware that executes the SWB1 instruction in the E unit 2-6. Firmware cycle 1 starts in block 2-660 by micro-word A-Bx (RDR 31-37 = hexadecimal 49) which addresses register B1 via the A port of register file 2-610. In block 2-662, micro-word RSLT-RFA (RDR 66-67 = 3) transfers the double operand, hexadecimal 4001 6230 to the input terminals of MUX,s 2-624, 2-626, 2-628, and 2-632 via register RFA 2-612, MUX 2-616,signals OPI 0-31, MUX 2-620, and signals RSLT 0-31.

In block 2-664, the double operand is translated to hexadecimal 6230 4001. In block 2-666, micro-word MMW-DWH (RDR 0=1, 20-21=1, 28-30=1, 45-46=1, 68-70=2) results in 4001 being written in location 1001 and 6230 being written in location 1002 of E-cache 6-4.

Block 2-668 branches to block 2-670 to start the second firmware cycle. Micro-word AUB-DAT (RDR 48-49=1, 50-51=0, 54-56=0) transfers the double operand hexadecimal E670 800F to the B input of ALU 2-608 via MUX,s 2-646, 2-648, 2-650, and 2-618 which translates the double operand to hexadecimal 800F E670. Block 2-672, micro-word AU-B (RDR 22-27=hexadecimal 35) passes the double operand through the ALU 2-608 to the input of MUX 2-636 via MUX 2-620 and signals RSLT 0-31.

Block 2-674, micro-word B-Bx (RDR 38-44=hexadecimal 49) addresses register B1 via the B port of register file 2-610. In block 2-676, micro-word RFW(B) (RDR 79-82=9) writes the double word hexadecimal 800F E670 into register B1. Block 2-678, micro-word DONE (RDR 63) signals the I unit 2-2 that the execution of the SWB1 instruction is completed. And block 2-280, micro-word MBMFT MBR branches to the next control store 2-604 location to read out the next micro-word into register RDR 2-606 in order to execute the next instruction in the production line.

While the invention has been shown and described with reference to the preferred embodiment thereof, it will be understood by those skilled in the art that the above and other changes in form and detail may be made therein without departing from the spirit and scope of the invention.

What is claimed is:

1. A data processing system for aligning operands during an execution of instructions comprising:
memory means including instruction memory means for storing a plurality of instructions and data memory means for storing a plurality of operands in word locations, said word locations having a word boundary starting with an even address location;
instruction register means coupled to said instruction memory means for storing said plurality of instructions received from said instruction memory means, one of said plurality of instructions specifying an operand type, and a word location of an operand;
data register means coupled to said data memory means for storing said plurality of operands received from said data memory means;
offset register means coupled to said instruction memory means for storing and generating a plurality of offset signals indicating said word location of said operand relative to said word boundary;
control store means coupled to said instruction register means and responsive to said one of said plurality of instructions for generating a plurality of control signals;
decoder means coupled to said control store means and responsive to a first plurality of said control signals for generating a plurality of type signals indicating said operand type used in said execution of said one of said plurality of instructions;
first logic means coupled to said offset register means and said decoder means and responsive to said plurality of type signals and said plurality of offset signals for generating a first plurality of selection signals for aligning words of said operand and a second plurality of selection signals for aligning bytes within said words of said operand;
first multiplexer means coupled to said data register means and said first logic means and responsive to said first plurality of selection signals for aligning said during said execution of said one of said plurality of instructions;
second logic means coupled to said control store means sand said first multiplexer means and responsive to a second plurality of said control signals for performing logic functions on said aligned operand in accordance with said one of said plurality of instructions to generate a second operand;
second multiplexer means coupled to said first logic means and said second logic means sand responsive to said second plurality of selection signals for aligning said second operand;
said data memory means further coupled to said second multiplexer means for storing said aligned second operand at a location specified by said one of said plurality of instructions wherein said aligned second operand is a result of said execution of said one of said plurality of instructions on said operand.

2. The system of claim 1 wherein said instruction register means is a first-in first-out logic element having a plurality of first registers, each storing an instruction.

3. The system of claim 2 wherein said data memory means is a multi-level cache subsystem made up of double word locations, each double word location having an even address for a high order word and an odd address for a low order word.

4. The system of claim 3 wherein said data register means is a first-in first-out logic element having a plurality of 32 bit double word registers, each storing a bit, a byte, a word or a double word operand.

5. The system of claim 4 wherein said offset register means is a first-in first-out logic element having a plurality of second registers, each storing offset bits specifying a location of a respective operand relative to said word boundary.

6. The system of claim 5 wherein said control store means comprises:

next address generator means responsive to said one of said plurality of instructions from said instruction register means for generating control store address signals;

address register means for storing said control store address signals;

a control store responsive to said address register signals for reading out one of a plurality of firmware words;

a control store register for storing said one of said plurality of firmware words and generating said plurality of control signals.

7. The system of claim 6 wherein said decoder means generates said plurality of type signals E-DW, E-SW and BYTE if said first plurality of said control store signals specifies the double word, single word or byte respectively.

8. The system of claim 7 wherein said first multiplexer means comprises :

a first multiplexer responsive to a first selection signal for selecting said low order word or said high order word from the double word for transfer over a high order word position of a first bus;

a second multiplexer responsive to a second selection signal for selecting a first byte or a third byte for transfer over a third byte position of said first bus; and a third multiplexer responsive to a third and a fourth selection signal for selecting said first byte, a second byte, said third byte, or a fourth byte for transfer over a fourth byte position of said first bus.

9. The system of claim 8 wherein said second multiplexer means comprises :

a fourth multiplexer responsive to a fifth and a sixth selection signal for selecting a fifth, a seventh or an eighth byte for transfer over a high order byte position of a second bus;

a fifth multiplexer responsive to a seventh selection signal for selecting a sixth or said eighth byte for transfer over a second byte position of said second bus;

a sixth multiplexer responsive to an eighth and a ninth selection signal for selecting said fifth ,a seventh or said eighth byte for transfer over a third byte position of said second bus; and a seventh multiplexer responsive to a tenth selection signal for selecting said eighth or said sixth byte for transfer over a fourth byte position of said second bus.

10. A data processing system for aligning operands during an execution of instructions comprising:

memory means including instruction memory means for storing a plurality of instructions and data memory means for storing a plurality of operands in word locations, said word locations having a word boundary starting with an even address location;

instruction register means coupled to said instruction memory means for storing said plurality of instructions received from said instruction memory means, one of said plurality of instructions specifying an operand type, and a word location of an operand;

data register means coupled to said data memory means for storing said plurality of operands received from said data memory means;

offset register means coupled to said instruction memory means for storing and generating a plurality of offset signals indicating said word location of said operand relative to said word boundary;

control store means coupled to said instruction register means and responsive to said one of said plurality of instructions for generating a plurality of control signals;

decoder means coupled to said control store means and responsive to a first plurality of said control signals for generating a plurality of type signals indicating said operand type used in said execution of said one of said plurality of instructions;

first logic means coupled to said offset register means and said decoder means and responsive to said plurality of type signals and said plurality of offset signals for generating selection signals;

multiplexer means coupled to said data register means and said first logic means and responsive to said selection signals for aligning said operand during said execution of said one of said plurality of instructions;

second logic means coupled to said control store means and said multiplexer means and responsive to a second plurality of said control signals for performing logic functions on said aligned operand in accordance with said one of said plurality of instructions to generate a second operand;

register file means coupled to said control store means and said second logic means for storing said second operand in one of a plurality of registers specified said plurality of control signals wherein said aligned second operand is a result of said execution of said one of said plurality of instructions on said operand.

11. A data processing system for aligning operands during an execution of instructions comprising:

memory means for storing said instructions, said operands and offset signals, said offset signals specifying a location of said operands within a word boundary, one of said instructions specifying an operand type, and a word location of an operand;

control store means coupled to said memory means and responsive to said one of said instructions for generating a plurality of control signals;

first logic means coupled to said memory means and said control store means and responsive to a first plurality of said control store signals and said offset signals for generating a plurality of selection signals;

first multiplexer means coupled to said memory means sand said first logic means and responsive to a first plurality of said selection signals for aligning said operand;

second logic means coupled to said control store means and said first multiplexer means and responsive to a second plurality of said control signals for performing logic functions on said aligned operand in accordance with said one of said instructions to generate a second operand;

second multiplexer means coupled to said first and said second logic means and responsive to a second plurality of said selection signals for aligning said second operand;

said memory means further coupled to said second multiplexer means for storing said aligned second operand at a location specified by said one of said instructions wherein said aligned second operand is a result of said execution of said one of said instructions on said operand.

12. The system of claim 11 wherein said memory means comprises:

instruction memory means for storing said instructions;

data memory means for storing said operands in word locations, said word locations having said word boundary starting with an even address location.

13. The system of claim 12 wherein said memory means further comprises:

instruction register means for storing said instructions received from said instruction memory means;

data register means for storing said operands received from said data memory means;

offset register means for storing and generating said offset signals.

14. The system of claim 13 wherein said control store means comprises:

next address generator means responsive to said one of said instructions from said instruction register means for generating control store address signals;

address register means for storing said control store address signals;

a control store responsive to said address register signals from said address register means for reading out one of a plurality of firmware words;

a control store register for storing said one of said plurality of firmware words and generating said plurality of control signals.

15. The system of claim 14 wherein said first logic means comprises:

decoder means responsive to a first plurality of control signals for generating type signals E-DW, E-SW and BYTE specifying a double word, a single word or a byte respectively.

16. The system of claim 15 wherein said first logic means further comprises:

selection means coupled to said decoder means and said offset register means and responsive to said type signals and said offset signals for generating said plurality of selection signals.

17. The system of claim 16 wherein said first multiplexer means comprises :

a first multiplexer responsive to a first selection signal for selecting a low order word or a high order word from the double word for transfer over a high order word position of a first bus;

a second multiplexer responsive to a second selection signal for selecting a first byte or a third byte for transfer over a third byte position of said first bus; and a third multiplexer responsive to a third and a fourth selection signal for selecting said first byte, a second byte, said third byte, or a fourth byte for transfer over a fourth byte position of said first bus.

18. The system of claim 17 wherein said second multiplexer means comprises :

a fourth multiplexer responsive to a fifth and a sixth selection signal for selecting a fifth, a seventh or an eighth byte for transfer over a high order byte position of a second bus;

a fifth multiplexer responsive to a seventh selection signal for selecting a sixth or said eighth byte for transfer over a second byte position of said second bus;

a sixth multiplexer responsive to an eighth and a ninth selection signal for selecting said fifth ,a seventh or said eighth byte for transfer over a third byte position of said second bus; and a seventh multiplexer responsive to a tenth selection signal for selecting said eighth or said sixth byte for transfer over a fourth byte position of said second bus.

19. A data processing system for aligning operands during an execution of instructions comprising:

memory means for storing said instructions, said operands and offset signals, said offset signals specifying a location of said operands within a word boundary, one of said instructions specifying an operand type, and a word location of an operand;

control store means coupled to said memory means and responsive to said one of said instructions for generating a plurality of control signals;

first logic means coupled to said memory means and said control store means and responsive to a first plurality of said control signals and said offset signals for generating selection signals;

multiplexer means coupled to said memory means and said first logic means and responsive to said selection signals for aligning said operand;

second logic means coupled to said control store means sand said multiplexer means and responsive to a second plurality of said control signals for performing logic functions on said aligned operand in accordance with said one of said instructions to generate a second operand;

register file means coupled to said control store means and said second logic means for storing said second operand in one of a plurality of registers specified by said control signals wherein said second operand is a result of said execution of said one of said plurality of instructions on said operand.

* * * * *